United States Patent
Udo (10) Patent No.: US 9,341,812 B2
(45) Date of Patent: May 17, 2016

(54) AUTOFOCUS MECHANISM WITH A FIRST AND SECOND AMPLIFICATION RATE

(71) Applicant: MITUTOYO CORPORATION, Kanagawa (JP)

(72) Inventor: Shohei Udo, Miyazaki (JP)

(73) Assignee: MITUTOYO CORPORATION, Kanagawa (JP)

( * ) Notice: Subject to any disclaimer, the term of this patent is extended or adjusted under 35 U.S.C. 154(b) by 160 days.

(21) Appl. No.: 14/315,876

(22) Filed: Jun. 26, 2014

(65) Prior Publication Data

US 2015/0001374 A1   Jan. 1, 2015

(30) Foreign Application Priority Data

Jul. 1, 2013   (JP) .................................. 2013-138159

(51) Int. Cl.

| | | |
|---|---|---|
| *G02B 21/24* | (2006.01) | |
| *G02B 7/28* | (2006.01) | |
| *H04N 5/225* | (2006.01) | |
| *G03B 3/00* | (2006.01) | |
| *G03B 13/00* | (2006.01) | |
| *G03B 13/36* | (2006.01) | |
| *G02B 7/38* | (2006.01) | |

(52) U.S. Cl.
CPC ................ *G02B 7/28* (2013.01); *G02B 21/247* (2013.01); *G02B 7/38* (2013.01); *G03B 3/00* (2013.01); *G03B 13/00* (2013.01); *G03B 13/36* (2013.01); *H04N 5/225* (2013.01)

(58) Field of Classification Search
CPC .......... H04N 5/225; G03B 3/00; G03B 13/00; G03B 13/36; G02B 21/247; G02B 7/28; G02B 7/38
See application file for complete search history.

(56) References Cited

U.S. PATENT DOCUMENTS

| 4,926,407 A | 5/1990 | Yamamuro |
| 5,568,309 A * | 10/1996 | Rockwell ............. H01S 3/2333 |
| | | 359/338 |
| 2004/0081429 A1* | 4/2004 | Sugano ................ G11B 27/329 |
| | | 386/230 |

FOREIGN PATENT DOCUMENTS

| JP | 07-105547 A | 4/1995 |
| JP | 2001-242375 | 9/2001 |
| JP | 2009-087512 | 4/2009 |

OTHER PUBLICATIONS

Search report from E.P.O., mail date is Dec. 3, 2014.
U.S. Appl. No. 14/315,826 to Shohei Udo, which was filed on Jun. 26, 2014.

* cited by examiner

*Primary Examiner* — Francis M Legasse, Jr.
(74) *Attorney, Agent, or Firm* — Greenblum & Bernstein, P.L.C.

(57) ABSTRACT

First and second amplifiers amplify a voltage value of a first signal and generate first and second amplified signals. Third and fourth amplifiers amplify the voltage value of a second signal and generate third and fourth amplified signals. A corrector corrects one of the first amplified signal and the second amplified signal based on a first correction function illustrating a relationship between the voltage value of the first amplified signal and the voltage value of the second amplified signal and generates one of a first corrected signal and a second corrected signal, and corrects one of the third amplified signal and the fourth amplified signal based on a second correction function illustrating a relationship between the voltage value of the third amplified signal and the voltage value of the fourth amplified signal and generates one of a third corrected signal and a fourth corrected signal.

3 Claims, 12 Drawing Sheets

AUTOFOCUS MECHANISM WITH A FIRST AND SECOND AMPLIFICATION RATE

CROSS-REFERENCE TO RELATED APPLICATIONS

The present application claims priority under 35 U.S.C. §119 of Japanese Application No. 2013-138159, filed on Jul. 1, 2013, the disclosure of which is expressly incorporated by reference herein in its entirety.

BACKGROUND OF THE INVENTION

1. Field of the Invention

The present invention relates to an autofocus mechanism adjusting a focal position with respect to a work piece.

2. Description of Related Art

Conventionally, an autofocus mechanism used in a measurement device is known (see Japanese Patent Laid-open Publication No. H07-105547). The autofocus mechanism uses a method emitting light at a work piece and identifying a focal position based on light reflected by the work piece. Specifically, the reflected light received by a photodiode is converted to an electric signal. Then, a low-strength electric signal is amplified by a high-magnification amplifier, while a high-strength electric signal is amplified by a low-magnification amplifier. Then, the focal position is identified based on the amplified electric signals.

However, offset and gain vary in the high-magnification amplifier and the low-magnification amplifier of the above-noted autofocus mechanism. Therefore, accuracy in identifying the focal position deteriorates. Moreover, feedback control, which tracks a surface of the work piece based on the focal position, cannot be performed stably.

SUMMARY OF THE INVENTION

The present disclosure provides an autofocus mechanism with improved accuracy in identifying a focal position.

An autofocus mechanism according to the present disclosure includes a light source emitting light through an objective lens at a work piece; a first detector detecting a first portion of light reflected by the work piece and generating a first signal; a second detector detecting a second portion of the reflected light and generating a second signal; a first amplifier amplifying a voltage value of the first signal by a first amplification rate and generating a first amplified signal; a second amplifier amplifying the voltage value of the first signal by a second amplification rate greater than the first amplification rate and generating a second amplified signal; a third amplifier amplifying the voltage value of the second signal by a third amplification rate and generating a third amplified signal; a fourth amplifier amplifying the voltage value of the second signal by a fourth amplification rate greater than the third amplification rate and generating a fourth amplified signal; a corrector correcting one of the first amplified signal and the second amplified signal based on a first correction function illustrating a relationship between the voltage value of the first amplified signal and the voltage value of the second amplified signal to generate one of a first corrected signal and a second corrected signal, and correcting one of the third amplified signal and the fourth amplified signal based on a second correction function illustrating a relationship between the voltage value of the third amplified signal and the voltage value of the fourth amplified signal to generate one of a third corrected signal and a fourth corrected signal; and a focal position identifier identifying a focal position of the objective lens with respect to the work piece based on the first amplified signal and the third amplified signal or the first corrected signal and the third corrected signal in a case where one of the first signal and the second signal is equal to or greater than a first threshold value. The focal position identifier identifies the focal position based on the second amplified signal and the fourth amplified signal or the second corrected signal and the fourth corrected signal in a case where one of the first signal and the second signal is not equal to or greater than the first threshold value.

According to the present disclosure, the corrector corrects one of the first amplified signal and the second amplified signal based on the first correction function illustrating the relationship between the voltage value of the first amplified signal and the voltage value of the second amplified signal, and corrects one of the third amplified signal and the fourth amplified signal based on the second correction function illustrating the relationship between the voltage value of the third amplified signal and the voltage value of the fourth amplified signal. Accordingly, the present disclosure can provide an autofocus mechanism inhibiting the effect of variation in gain and offset of the first through fourth amplifiers, the autofocus mechanism having improved accuracy in identifying the focal position.

BRIEF DESCRIPTION OF THE DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DETAILED DESCRIPTION OF THE INVENTION

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

FIRST EMBODIMENT

Figure 1:
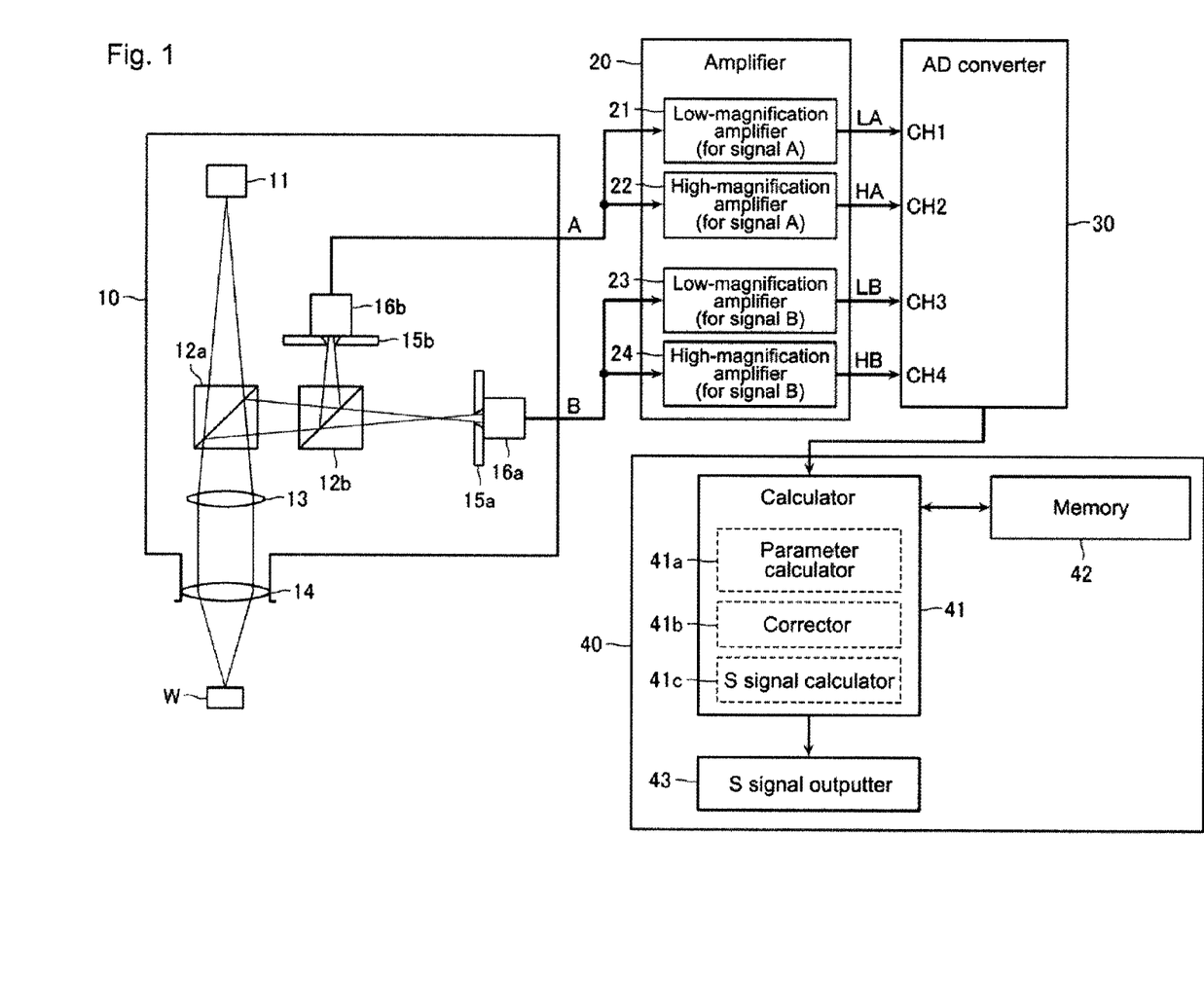
FIG. 1 is a schematic view illustrating a configuration of an autofocus mechanism according to a first embodiment.

FIG. 1 is a schematic view illustrating a configuration of an autofocus mechanism according to a first embodiment. The autofocus mechanism according to the present embodiment is a laser autofocus mechanism using a so-called double pinhole method, and is installed in optical devices such as a microscope and an image measuring instrument, for example.

As shown in FIG. 1, the autofocus mechanism according to the present embodiment includes an optical head 10, an amplifier 20, an AD converter 30, and a computer 40. The optical head 10 emits laser light at a work piece W, receives the light reflected by the work piece W, and converts the reflected light into an electric signal. The amplifier 20 amplifies the electric signal received from the optical head 10. The AD converter 30 converts the electric signal received from the amplifier 20 from an analog signal into a digital signal. The computer 40 identifies a focal position with respect to the work piece W based on the signal received from the AD converter 30.

As shown in FIG. 1, in the optical head 10, a light source (laser diode) 11 emits laser light, which is emitted at a beam splitter 12a. The beam splitter 12a allows light from the light source 11 to pass and bombard a tube lens 13, and reflects the light reflected by the work piece W onto a beam splitter 12b.

The tube lens 13 converts the light from the beam splitter 12a into parallel light, which is emitted through an objective lens 14 at the work piece W. In addition, the tube lens 13 allows the light reflected by the work piece W to bombard the beam splitter 12a. The beam splitter 12b scatters the light from the beam splitter 12a and allows transmitted light to bombard, through a pinhole 15a, a photoreceiver element (photodiode) 16a. In addition, the beam splitter 12b allows reflected light to bombard, through a pinhole 15b, a photoreceiver element (photodiode) 16b. The photoreceiver elements 16a and 16b output a signal A and a signal B, respectively, to the amplifier 20 based on an amount of light received.

In FIG. 1, when the optical head 10 (objective lens 14) is arranged in the focal position with respect to the work piece W, output of the photoreceiver elements 16a and 16b is equal. When the optical head 10 is arranged so as to be further away from the work piece W than is the focal position, the output of the photoreceiver element 16b is greater than the output of the photoreceiver element 16a. Meanwhile, when the optical head 10 is arranged so as to be closer to the work piece W than is the focal position, the output of the photoreceiver element 16b is less than the output of the photoreceiver element 16a. Making use of such changes, the present embodiment can identify the focal position of the optical head 10 (objective lens 14) with respect to the work piece W.

As shown in FIG. 1, the amplifier 20 includes a low-magnification amplifier 21 for the signal A, a high-magnification amplifier 22 for the signal A, a low-magnification amplifier 23 for the signal B, and a high-magnification amplifier 24 for the signal B. The low-magnification amplifier 21 outputs a low-magnification amplified signal LA, which is an amplification of the signal A, to a channel CH1 of the AD converter 30. The high-magnification amplifier 22 outputs a high-magnification amplified signal HA to a channel CH2 of the AD converter 30, the high-magnification amplified signal HA being an amplification of the signal A by an amplification rate greater than the amplification rate of the low-magnification amplifier 21. The low-magnification amplifier 23 outputs a low-magnification amplified signal LB, which is an amplification of the signal B, to a channel CH3 of the AD converter 30. The high-magnification amplifier 24 outputs a high-magnification amplified signal HB to a channel CH4 of the AD converter 30, the high-magnification amplified signal HB being an amplification of the signal B by an amplification rate greater than the amplification rate of the low-magnification amplifier 23.

The AD converter 30 converts the signals LA, HA, LB, and HB from analog signals into digital signals and outputs the converted signals to the computer 40.

As shown in FIG. 1, the computer 40 includes a calculator 41, a memory 42, and an S signal outputter 43. The calculator 41 executes various calculations based on the signals LA, HA, LB, and HB input from the AD converter 30. The memory 42 stores correction parameters for correcting a voltage value of the signals. The S signal outputter 42 outputs an S signal to an exterior. Herein, the S signal is a signal identifying the focal position of the objective lens 14 with respect to the work piece W. For example, the S signal outputter 43 converts a digital signal to an analog signal and outputs the signal. Alternatively, the S signal outputter 43 outputs serial or parallel digital signals.

As shown in FIG. 1, the calculator 41 includes a parameter calculator 41a, a corrector 41b, and an S signal calculator 41c. The parameter calculator 41a calculates the correction parameters of the signals LA and LB. The corrector 41b corrects the signals LA and LB based on the correction parameters. The S signal calculator 41c (focal position identifier) calculates the S signal, which identifies the focal position, based on the signals LA, LB, HA, and HB.

Figure 2:
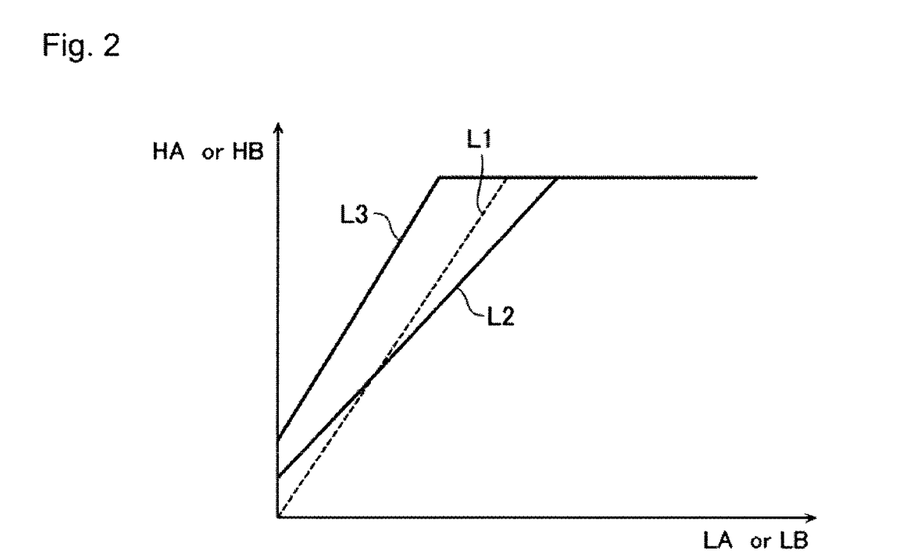
FIG. 2 illustrates a relationship between a signal LA and a signal HA, and a relationship between a signal LB and a signal HB.

Here, a concrete description is given of correction in the autofocus mechanism. FIG. 2 illustrates a relationship between the signal LA and the signal HA, and a relationship between the signal LB and the signal HB. The ideal relationship between the signal LA and the signal HA, and an ideal relationship between the signal LB and the signal HB are both represented by a dashed line L1 in FIG. 2. However, offset and gain vary in the high-magnification amplifier and the low-magnification amplifier. Accordingly, as shown in FIG. 2, the actual relationship between the signal LA and the signal HA and the actual relationship between the signal LB and the signal HB are represented by straight lines L2 and L3, respectively, which both deviate from the ideal dashed line L1. Accordingly, errors occur when the relationship between the signal LA and the signal HA is presumed to be the ideal relationship and the signals are corrected such that the signal LA matches the signal HA. Similarly, errors occur when the relationship between the signal LB and the signal HB is presumed to be the ideal relationship and the signals are corrected such that the signal LB matches the signal HB.

Figure 3:
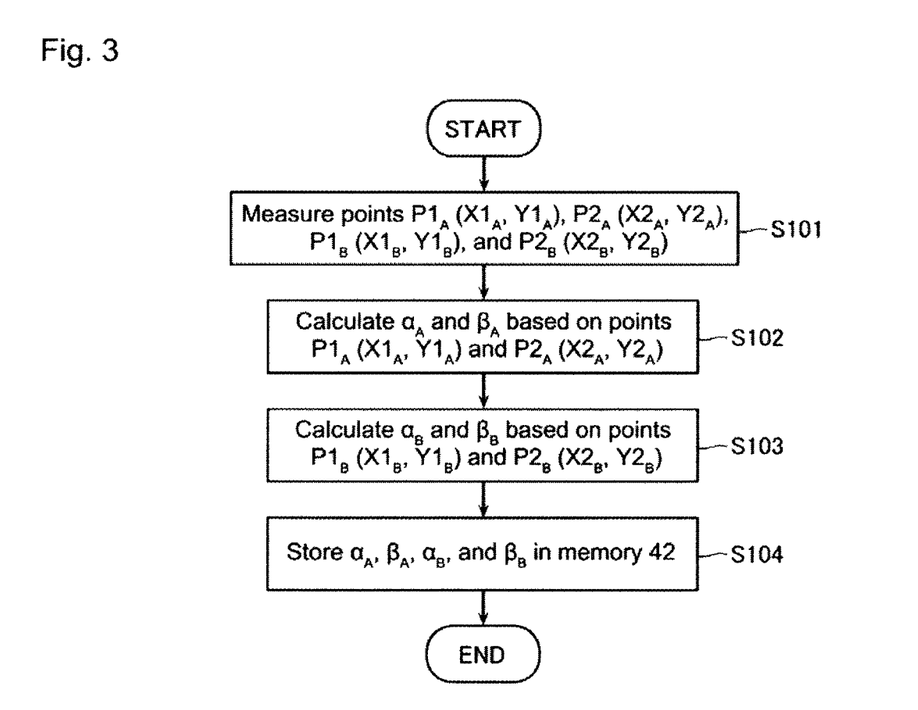
FIG. 3 is a flowchart illustrating a correction parameter calculation process according to the first embodiment.

In the present embodiment, the calculator 41 (parameter calculator 41a and corrector 41b) executes a correction parameter calculation process and a correction process, as shown below. As shown in FIG. 3, in the correction parameter calculation process, the parameter calculator 41a arranges the optical head 10 in different positions with respect to the work piece W and performs measurement at least twice. Thereby, measurement of points $P1_A (X1_A, Y1_A)$, $P2_A (X2_A, Y2_A)$, $P1_B (X1_B, Y1_B)$, and $P2_B (X2_B, Y2_B)$ is performed (S101).

Figure 4:
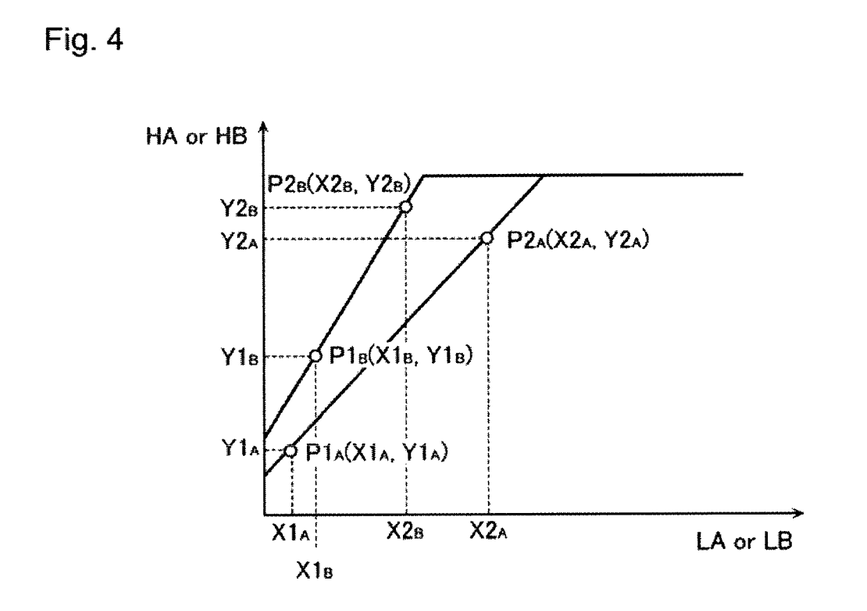
FIG. 4 illustrates a method of finding correction parameters according to the first embodiment.

In an example shown in FIG. 4, the voltage value of the signal LA detected by a first measurement is $X1_A$, and the voltage value of the corresponding signal HA is $Y1_A$. The point expressed by $X1_A$ and $Y1_A$ is the point P1A ($X1_A$, $Y1_A$). Further, the voltage value of the signal LA detected by a second measurement is $X2_A$, and the voltage value of the corresponding signal HA is $Y2_A$. The point expressed by $X2_A$ and $Y2_A$ is the point $P2_A$ ($X2_A$, $Y2_A$). In addition, the points $P1_B$ ($X1_B$, $Y1_B$) and $P2_B$ ($X2_B$, $Y2_B$) are found for the signals LB and HB in a similar manner.

Following step S101, the parameter calculator 41a calculates correction parameters $\alpha_A$ and $\beta_A$ based on the point $P1_A$ ($X1_A$, $Y1_A$) and the point $P2_A$ ($X2_A$, $Y2_A$) (S102). As shown in FIG. 4, a function linking the point $P1_A$ ($X1_A$, $Y1_A$) and the point $P2_A$ ($X2_A$, $Y2_A$) is expressed by $[Y=\alpha_A+\beta_A \cdot X]$. Specifically, $\alpha_A$ is an intercept (offset) and $\beta_A$ is a slope (gain). Accordingly, the slope $\beta_A$ is found by $[\beta_A=(Y1_A-Y2_A) \div (X1_A-X2_A)]$ while the intercept $\beta_A$ is found by $[\alpha_A=Y1_A-\beta_A \cdot X1_A]$.

Following step S102, the parameter calculator 41a calculates correction parameters $\alpha_B$ and $\beta_B$ based on the point $P1_B$ ($X1_B$, $Y1_B$) and the point $P2_B$ ($X2_B$, $Y2_B$) (S103). Calculation of $\alpha_B$ and $\beta_B$ is similar to that of $\alpha_A$ and $\beta_A$, and thus a description thereof is omitted. In addition, the parameter calculator 41a stores the correction parameters $\alpha_A$, $\beta_A$, $\alpha_B$, and $\beta_B$ in the memory 42 (S104).

Figure 5:
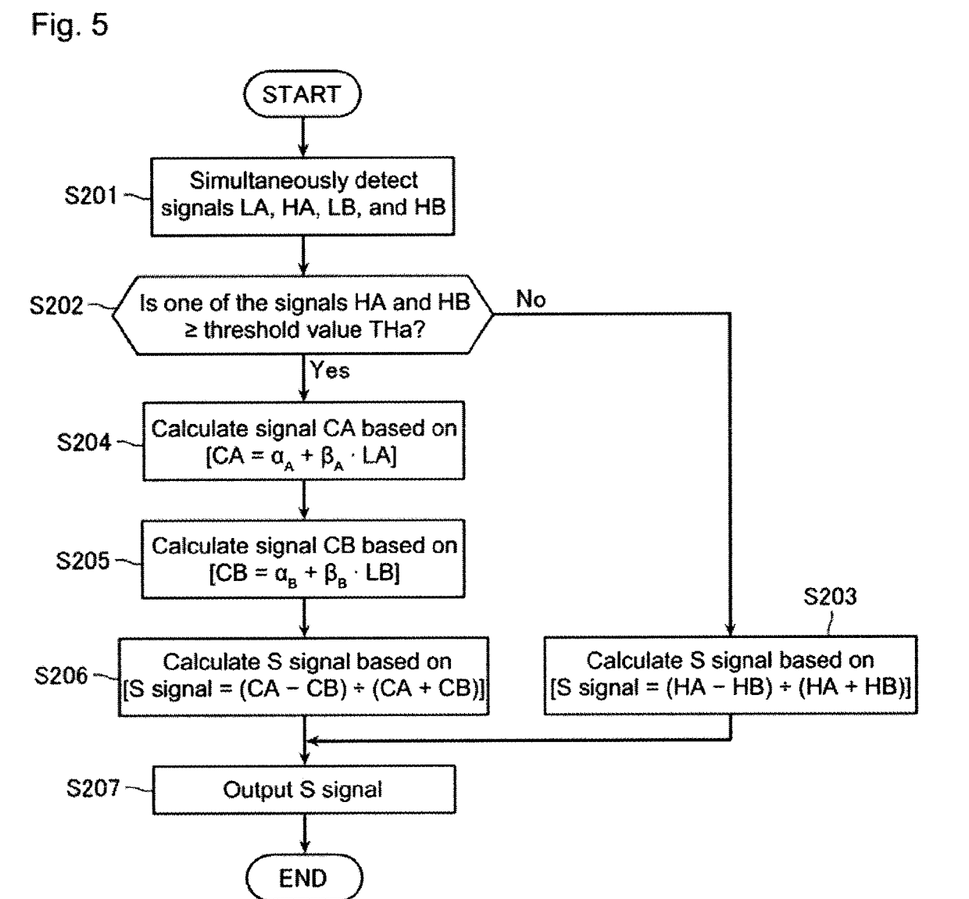
FIG. 5 is a flowchart illustrating a correction process according to the first embodiment.

Next, the correction process is described with reference to FIG. 5. As shown in FIG. 5, the corrector 41b simultaneously detects the signals LA, HA, LB, and HB (S201). Next, the corrector 41b determines whether one of the signals HA and HB is equal to or greater than a threshold value THa (S202). Using the determination of step S202, a determination is also made as to whether one of the signal A and the signal B is equal to or greater than a predetermined threshold value.

When one of the signals HA and HB is not equal to or greater than the threshold value THa (S202: No), the S signal calculator 41c calculates the S signal based on [S signal=(HA−HB)÷(HA+HB)] (S203).

Meanwhile, when one of the signals HA and HB is equal to or greater than the threshold value THa (S202: Yes), the corrector 41b corrects the signal LA based on $[CA=\alpha_A+\beta_A \cdot LA]$ and calculates a signal CA (S204). Next, the corrector 41b corrects the signal LB based on $[CB=\alpha_B+\beta_B \cdot LB]$ and calculates a signal CB (S205). Then, the S signal calculator 41c calculates the S signal based on [S signal=(CA−CB)÷(CA+CB)] (S206).

Then, after step S203 or S206, the S signal outputter 43 outputs the S signal (S207).

Figure 6:
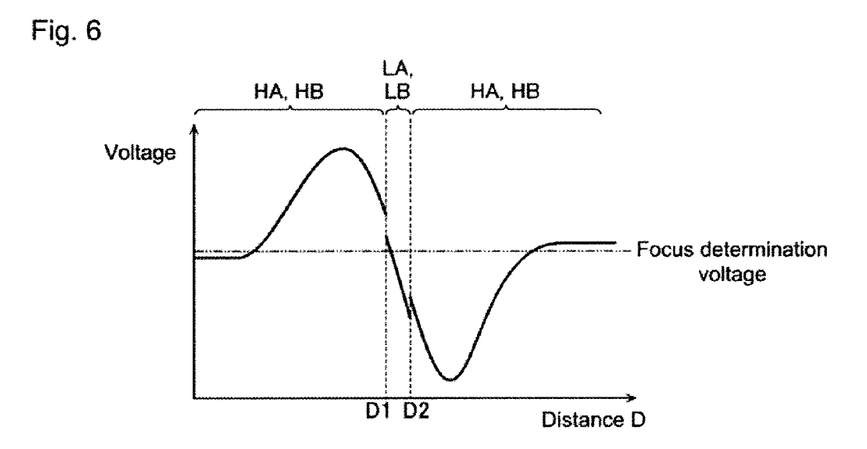
FIG. 6 illustrates an S signal according to a comparative example.

Next, an advantage of the present embodiment is described in comparison to a comparative example. The comparative example differs from the present embodiment in that the S signal is calculated without correcting the signals LA and LB. FIG. 6 illustrates the S signal according to the comparative example. A horizontal axis in FIG. 6 represents a distance D between the objective lens 14 and the work piece W, while a vertical axis in FIG. 6 represents voltage of the S signal.

In the comparative example, as shown in FIG. 6, the S signal is calculated based on the signals LA and LB in a range where D1<D<D2. Meanwhile, the S signal is calculated based on the signals HA and HB in a range where D<D1 or D2<D. In addition, when the voltage value of the S signal matches a focus determination voltage, a determination is made that the optical head 10 (objective lens 14) is in the focal position with respect to the work piece W. However, offset and gain vary in the high-magnification amplifier and the low-magnification amplifier. Accordingly, in the comparative example, a value of the S signal becomes discontinuous due to D=D1 or D=D2, where the signals used in calculation of the S signal are switched. Therefore, errors occur in the determination of the focal position.

Figure 7:
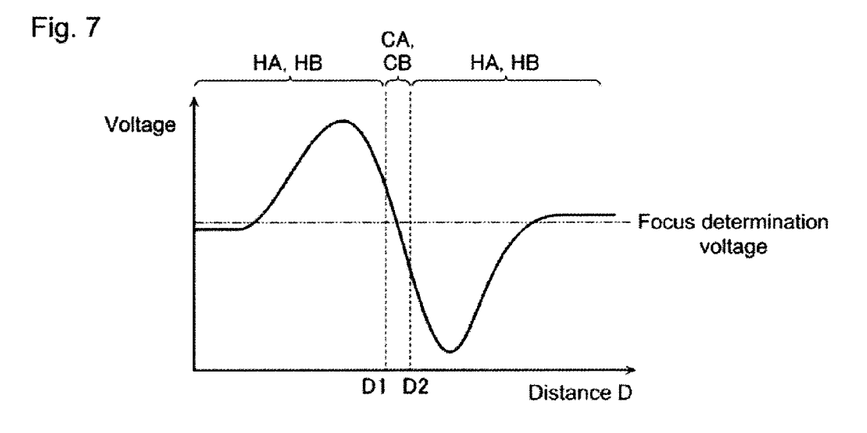
FIG. 7 illustrates an S signal according to the first embodiment.

In contrast, in the present embodiment, the signals LA and LB are corrected as described above and the signals CA and CB are calculated. In addition, the present embodiment calculates the S signal based on the post-correction signals CA and CB. Thus, the present embodiment inhibits an effect of variation in the gain and offset of the amplifiers 21 to 24 and, as shown in FIG. 7, the value of the S signal is continuous even when D=D1 or D=D2. Accordingly, the present embodiment can determine the focal position more accurately than the comparative example.

SECOND EMBODIMENT

Next, an autofocus mechanism according to a second embodiment is described. In the autofocus mechanism according to the second embodiment, only the correction process differs from the first embodiment. Other configurations are similar to those of the first embodiment.

Figure 8:
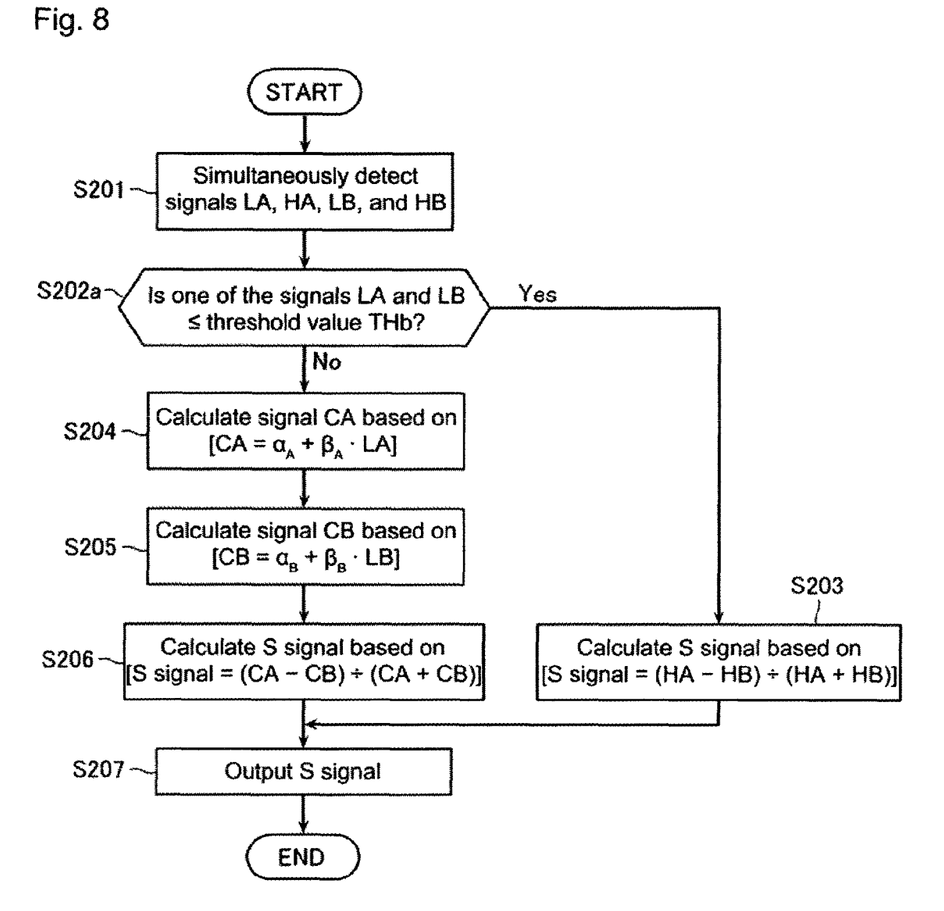
FIG. 8 is a flowchart illustrating a correction process according to a second embodiment.

In the second embodiment, as shown in FIG. 8, after step S201, the corrector 41b determines whether one of the signals LA and LB is equal to or less than the threshold value THb (S202a).

When one of the signals LA and LB is determined to be equal to or less than the threshold value THb in step S202a (S202a: Yes), the corrector 41b executes step S203. Meanwhile, when one of the signals LA and LB is determined to not be equal to or less than the threshold value THb (S202a: No), the corrector 41b executes step S204. The second embodiment described above achieves a similar effect to that of the first embodiment.

THIRD EMBODIMENT

Next, an autofocus mechanism according to a third embodiment is described. The first embodiment calculates the S signal based on the signals CA and CB, which are corrections of the signals LA and LB, respectively. In contrast, the third embodiment calculates the S signal based on signals CA' and CB', which are corrections of the signals HA and HB, respectively. The third embodiment differs from the first embodiment in this respect. Other configurations of the third embodiment are similar to those of the first embodiment and so a description thereof is omitted.

Figure 9:
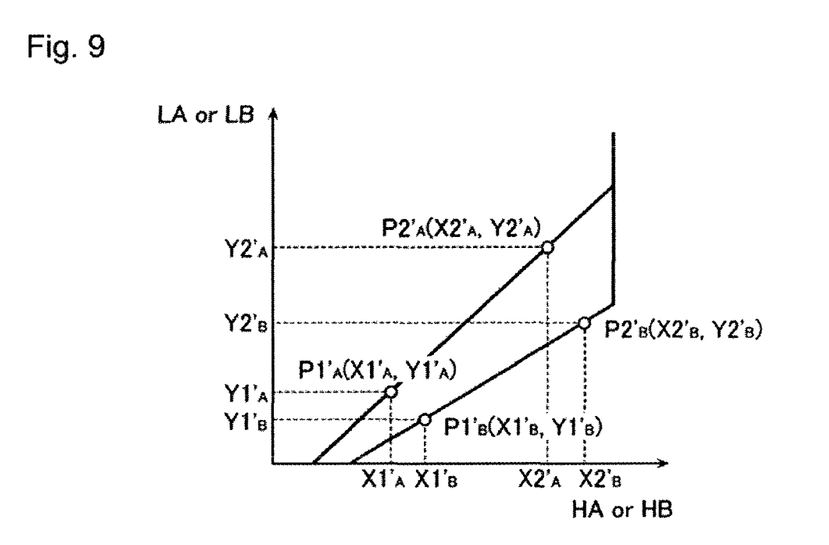
FIG. 9 illustrates a method of finding correction parameters according to a third embodiment.

In the third embodiment, in an example shown in FIG. 9, the voltage value of the signal HA detected by a first measurement is $X1'_A$, and the voltage value of the corresponding signal LA is $Y1'_A$. The point expressed by Xb $1'_A$ and $Y1'_A$ is a point $P1'_A$ ($X1'_A$, $Y1'_A$). Further, the voltage value of the signal HA detected by a second measurement is $X2'_A$, and the voltage value of the corresponding signal LA is $Y2'_A$. The point expressed by $X2'_A$ and $Y2'_A$ is a point $P2'_A$ ($X2'_A$, $Y2'_A$). In addition, points Pb $1'_B$ ($X1'_B$, $Y1'_B$) and $P2'_B$ ($X2'_B$, $Y2'_B$) are found for the signals HB and LB in a similar manner.

Furthermore, as shown in FIG. 9, a function linking the point $P1'_A$ ($X1'_A$, $Y1'_A$) and the point $P2'_A$ ($X2'_A$, $Y2'_A$) is expressed by $[Y=\alpha'_A+\beta'_A \cdot X]$. Specifically, $\alpha'_A$ is an intercept and $\beta'_A$ is a slope. Accordingly, the slope $\beta'_A$ is found by $[\beta'_A=(Y1'_A-Y2'_A) \div (X1'_A-X2'_A)]$ while the intercept $\alpha'_A$ is found by $[\alpha'_A=Y1'_A-\beta'_A \cdot X1'_A]$.

Figure 10:
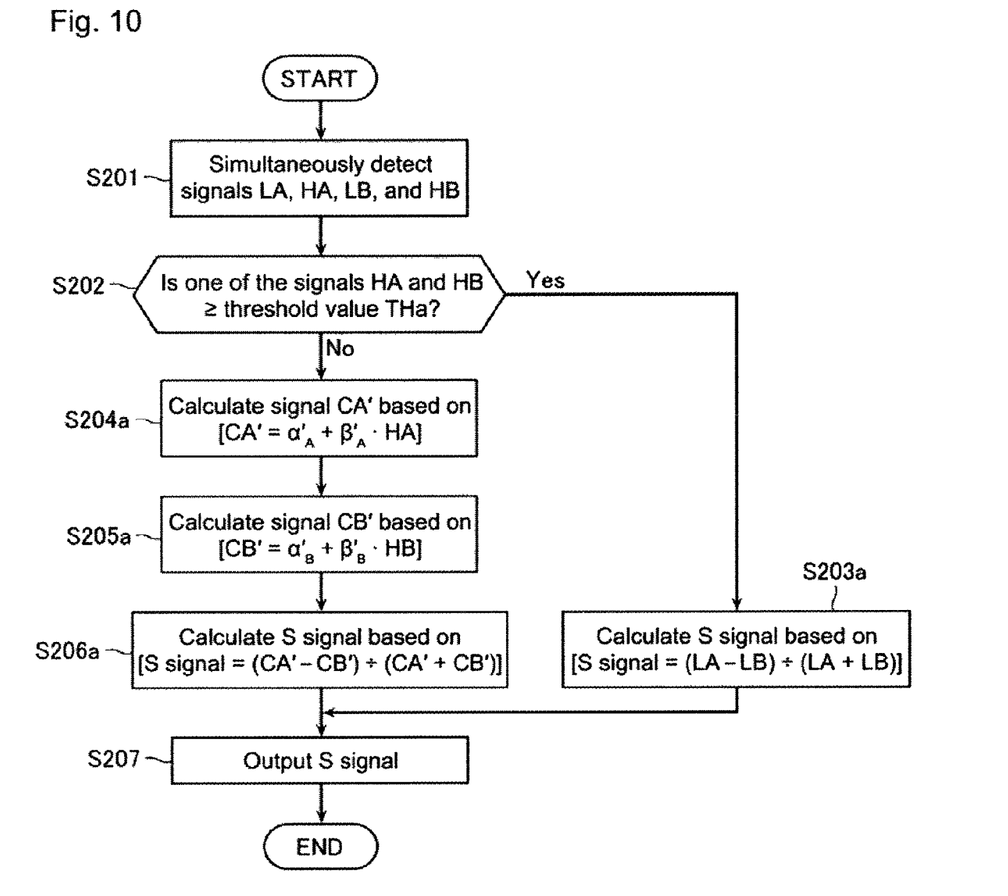
FIG. 10 is a flowchart illustrating a correction process according to the third embodiment.

Next, a correction process according to the third embodiment is described with reference to FIG. 10. First, steps S201 and S202 are executed in a manner similar to that of the first embodiment.

When the voltage value of one of the signals HA and HB is equal to or greater than the threshold value THa (S202: Yes), the S signal calculator 41c calculates the S signal based on [S signal=(LA−LB)÷(LA+LB)] (S203a).

Meanwhile, when neither of the signals HA and HB is equal to or greater than the threshold value THa (S202: No), the corrector 41b corrects the signal HA based on [CA'=α'$_A$+β'$_A$·HA] and calculates a signal CA' (S204a). Next, the corrector 41b corrects the signal HB based on [CB'=α'$_B$+β'$_B$·HB] and calculates a signal CB' (S205a). Then, the S signal calculator 41c calculates the S signal based on [S signal=(CA'−CB')÷(CA'+CB')] (S206a). Subsequent processes are similar to those of the first embodiment and so a description thereof is omitted. The third embodiment described above achieves a similar effect to that of the first embodiment.

FOURTH EMBODIMENT

Next, an autofocus mechanism according to a fourth embodiment is described. In the autofocus mechanism according to the fourth embodiment, only the correction process differs from the third embodiment. Other configurations are similar to those of the third embodiment.

Figure 11:
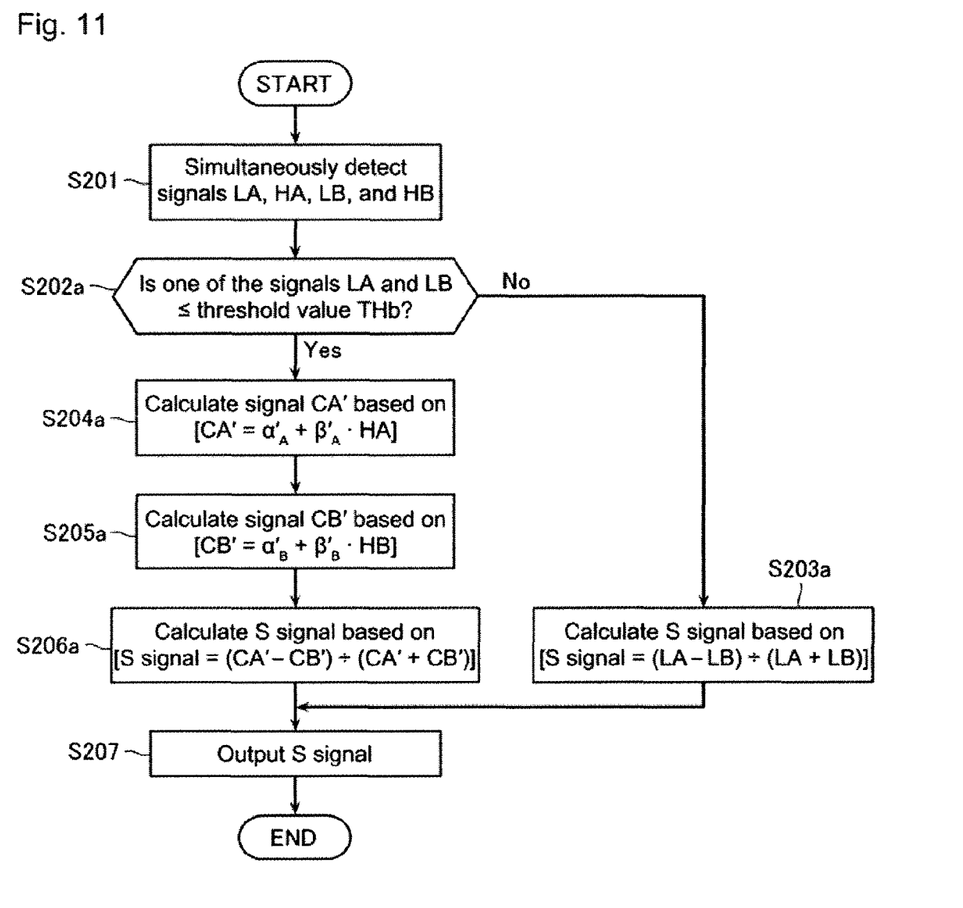
FIG. 11 is a flowchart illustrating a correction process according to a fourth embodiment.

In the fourth embodiment, as shown in FIG. 11, after step S201, the corrector 41b determines whether one of the signals LA and LB is equal to or less than the threshold value THb (S202a).

When neither of the signals LA and LB is determined to be equal to or less than the threshold value THb in step S202a (S202a: No), the corrector 41b executes step S203a. Meanwhile, when one of the signals LA and LB is determined to be equal to or less than the threshold value THb (S202a: Yes), the corrector 41b executes step S204a. The fourth embodiment described above achieves a similar effect to that of the first embodiment.

FIFTH EMBODIMENT

Figure 12:
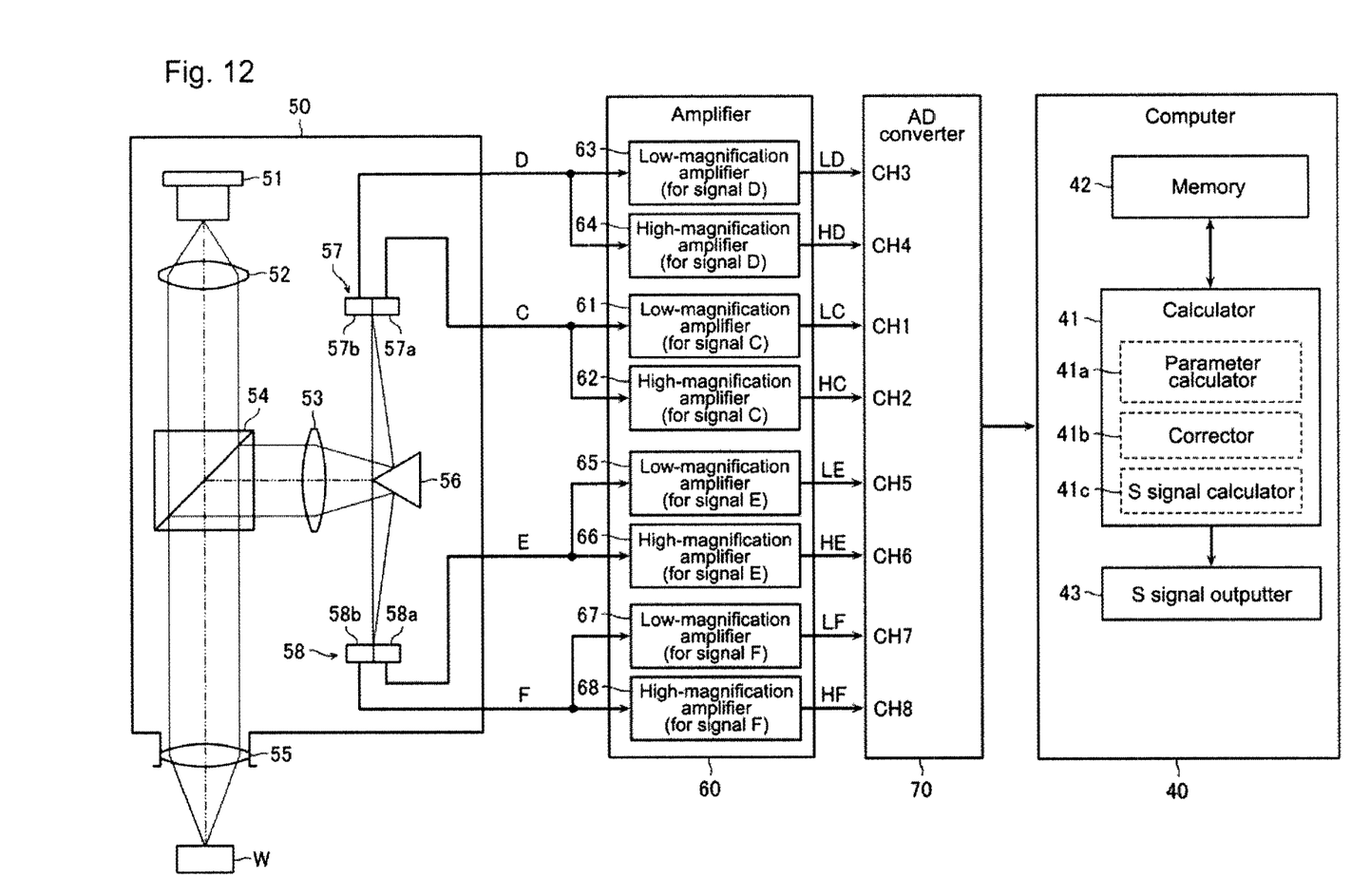
FIG. 12 is a schematic view illustrating a configuration of an autofocus mechanism according to a fifth embodiment.

Next, an autofocus mechanism according to a fifth embodiment is described with reference to FIG. 12. The autofocus mechanism according to the present embodiment is a laser autofocus mechanism using a double knife-edge method. As shown in FIG. 12, the autofocus mechanism according to the present embodiment includes an optical head 50, an amplifier 60, an AD converter 70, and the computer 40.

As shown in FIG. 12, in the optical head 50, a light source (laser diode) 51 emits laser light. The laser light traverses a tube lens 52 and a beam splitter 54 to pass through an objective lens 55, and is emitted on the work piece W. A beam of light that has passed through the objective lens 55 forms a light point image at the focal position of the objective lens 55. FIG. 12 illustrates an exemplary case where the focal position of the objective lens 55 is matched to the work piece W. The light reflected by the work piece W passes through the objective lens 55, is reflected by the beam splitter 54, passes through an auxiliary lens 53, and is guided to a triangular prism 56.

Of the light split by the triangular prism 56, a first portion forms a light point image on a halved sensor 57, which is configured by halved photoreceiver elements 57a and 57b. A second portion of the light forms a light point image on a halved sensor 58, which is configured by halved photoreceiver elements 58a and 58b.

In the present embodiment, when relative positions of the work piece W and the optical head 50 change in an optical axis direction of the objective lens 55 and the work piece W deviates from the focal position of the objective lens 55, the light point image on the halved sensor 57 is blurry. When the optical head 50 (objective lens 55) is closer to the work piece W than is the focal position, the amount of light received by the photoreceiver elements 57a and 58a increases. Meanwhile, when the optical head 50 (objective lens 55) is further away from the work piece W than is the focal position, the amount of light received by the photoreceiver elements 57b and 58b increases. Making use of such changes, the present embodiment can identify the focal position of the optical head 50 (objective lens 55) with respect to the work piece W. Moreover, the photoreceiver elements 57a and 57b output a signal C and a signal D, respectively, based on the amount of light received. The photoreceiver elements 58a and 58b output a signal E and a signal F, respectively, based on the amount of light received.

As shown in FIG. 12, the amplifier 60 includes a low-magnification amplifier 61 for the signal C, a high-magnification amplifier 62 for the signal C, a low-magnification amplifier 63 for the signal D, and a high-magnification amplifier 64 for the signal D. Moreover, the amplifier 60 includes a low-magnification amplifier 65 for the signal E, a high-magnification amplifier 66 for the signal E, a low-magnification amplifier 67 for the signal F, and a high-magnification amplifier 68 for the signal F.

The low-magnification amplifier 61 outputs a low-magnification amplified signal LC, which is an amplification of the signal C, to a channel CH1 of the AD converter 70. The high-magnification amplifier 62 outputs a high-magnification amplified signal HC to a channel CH2 of the AD converter 70, the high-magnification amplified signal HC being an amplification of the signal C by an amplification rate greater than the amplification rate of the low-magnification amplifier 61. The low-magnification amplifier 63 outputs a low-magnification amplified signal LD, which is an amplification of the signal D, to a channel CH3 of the AD converter 70. The high-magnification amplifier 64 outputs a high-magnification amplified signal HD to a channel CH4 of the AD converter 70, the high-magnification amplified signal HD being an amplification of the signal D by an amplification rate greater than the amplification rate of the low-magnification amplifier 63.

The low-magnification amplifier 65 outputs a low-magnification amplified signal LE, which is an amplification of the signal E, to a channel CH5 of the AD converter 70. The high-magnification amplifier 66 outputs a high-magnification amplified signal HE to a channel CH6 of the AD converter 70, the high-magnification amplified signal HE being an amplification of the signal E by an amplification rate greater than the amplification rate of the low-magnification amplifier 65. The low-magnification amplifier 67 outputs a low-magnification amplified signal LF, which is an amplification of the signal F, to a channel CH7 of the AD converter 70. The high-magnification amplifier 68 outputs a high-magnification amplified signal HF to a channel CH8 of the AD converter 70, the high-magnification amplified signal HF being an amplification of the signal F by an amplification rate greater than the amplification rate of the low-magnification amplifier 67.

The AD converter 30 converts the signals LC, HC, LD, HD, LE, HE, LF, and HF from analog signals into digital signals and outputs the converted signals to the computer 40.

The computer 40 has a configuration substantially similar to that of the first embodiment. However, content processed by the calculator 41 according to the fifth embodiment is different from that of the first embodiment.

Figure 13:
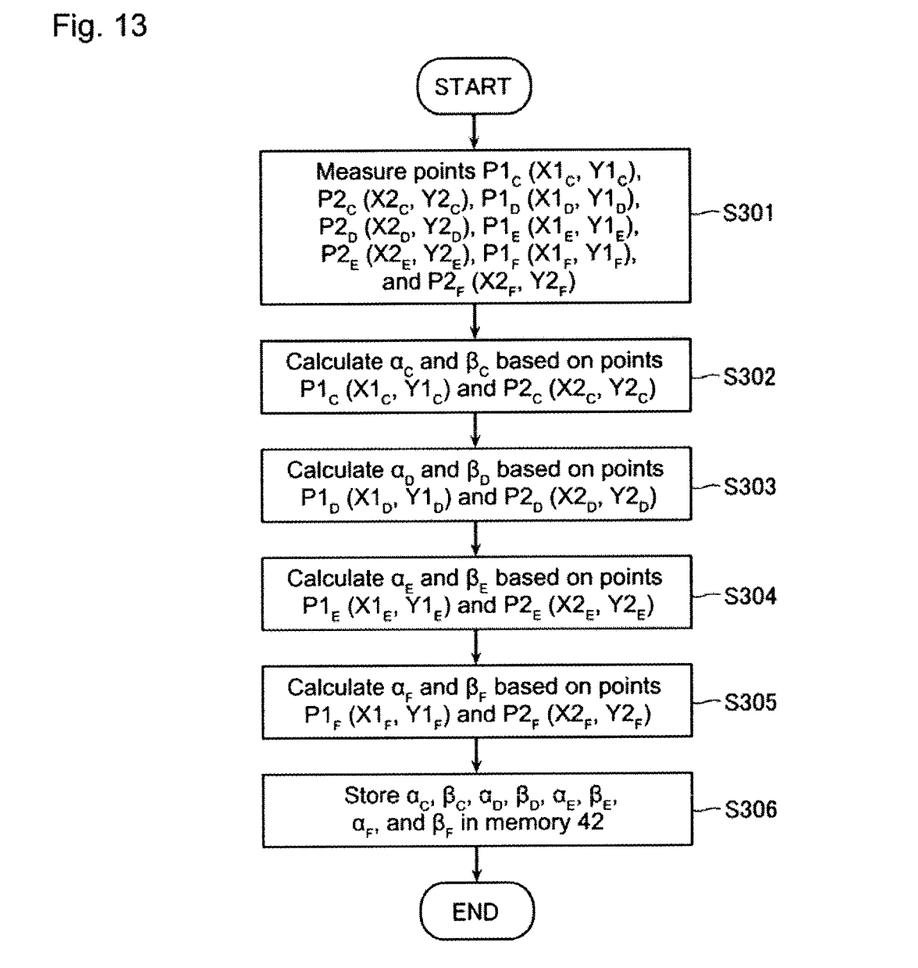
FIG. 13 is a flowchart illustrating a correction parameter calculation process according to the fifth embodiment.

First, the correction parameter calculation process is described with reference to FIG. 13. In the fifth embodiment, the parameter calculator 41a arranges the optical head 50 in different positions with respect to the work piece W and performs measurement at least twice. Thereby, measurement of $P1_C$ ($X1_C$, $Y1_C$), $P2_C$ ($X2_C$, $Y2_C$), $P1_D$ ($X1_D$, $Y1_D$), $P2_D$ ($X2_D$, $Y2_D$), $P1_E$ ($X1_E$, $Y1_E$), $P2_E$ ($X2_E$, $Y2_E$), $P1_F$ ($X1_F$, $Y1_F$), and $P2_F$ ($X2_F$, $Y2_F$) is performed (S301).

Here, the voltage value of the signal LC detected by a first measurement is $X1_C$, and the voltage value of the corresponding signal HC is $Y1_C$. The point expressed by $X1_C$ and $Y1_C$ is a point $P1_C$ ($X1_C$, $Y1_C$). Further, the voltage value of the signal LC detected by a second measurement is $X2_C$, and the voltage value of the corresponding signal HC is $Y2_C$. The point expressed by $X2_C$ and $Y2_C$ is a point $P2_C$ ($X2_C$, $Y2_C$). Moreover, points $P1_D$ ($X1_D$, $Y1_D$) and $P2_D$ ($X2_D$, $Y2_D$) are found in a similar manner for the signals LD and HD. Also, points $P1_E$ ($X1_E$, $Y1_E$) and $P2_E$ ($X2_E$, $Y2_E$) are found for the signals LE and HE, and points $P1_F$ ($X1_F$, $Y1_F$) and $P2_F$ ($X2_F$, $Y2_F$) are found for the signals LF and HF.

Following step S301, the parameter calculator 41a calculates correction parameters $\alpha_C$ and $\beta_C$ based on the point $P1_C$ ($X1_C$, $Y1_C$) and the point $P2_C$ ($X2_C$, $Y2_C$) (S302). A function linking the point $P1_C$ ($X1_C$, $Y1_C$) and the point $P2_C$ ($X2_C$, $Y2_C$) is expressed by [$Y=\alpha_C+\beta_C \cdot X$]. The slope $\beta_C$ is found by [$\beta_C=(Y1_C-Y2_C)\div(X1_C-X2_C)$] while the intercept $\alpha_C$ is found by [$\alpha_C=Y1_C-\beta_C \cdot X1_C$].

Then, the parameter calculator 41a calculates correction parameters $\alpha_D$ and $\beta_D$ based on the point $P1_D$ ($X1_D$, $Y1_D$) and the point $P2_D$ ($X2_D$, $Y2_D$) (S303). Next, the parameter calculator 41a calculates correction parameters $\alpha_E$ and $\beta_E$ based on the point $P1_E$ ($X1_E$, $Y1_E$) and the point $P2_E$ ($X2_E$, $Y2_E$) (S304). Then, the parameter calculator 41a calculates correction parameters $\alpha_F$ and $\beta_F$ based on the point $P1_F$ ($X1_F$, $Y1_F$) and the point $P2_F$ ($X2_F$, $Y2_F$) (S305). Calculation of the correction parameters $\alpha_D$, $\beta_D$, $\alpha_E$, $\beta_E$, $\alpha_F$, and $\beta_F$ is similar to that of the correction parameters $\alpha_C$ and $\beta_C$, and so a description thereof is omitted. In addition, the parameter calculator 41a stores the correction parameters $\alpha_C$, $\beta_C$, $\alpha_D$, $\beta_D$, $\alpha_E$, $\beta_E$, $\alpha_F$, and $\beta_F$ in the memory 42 (S306).

Figure 14:
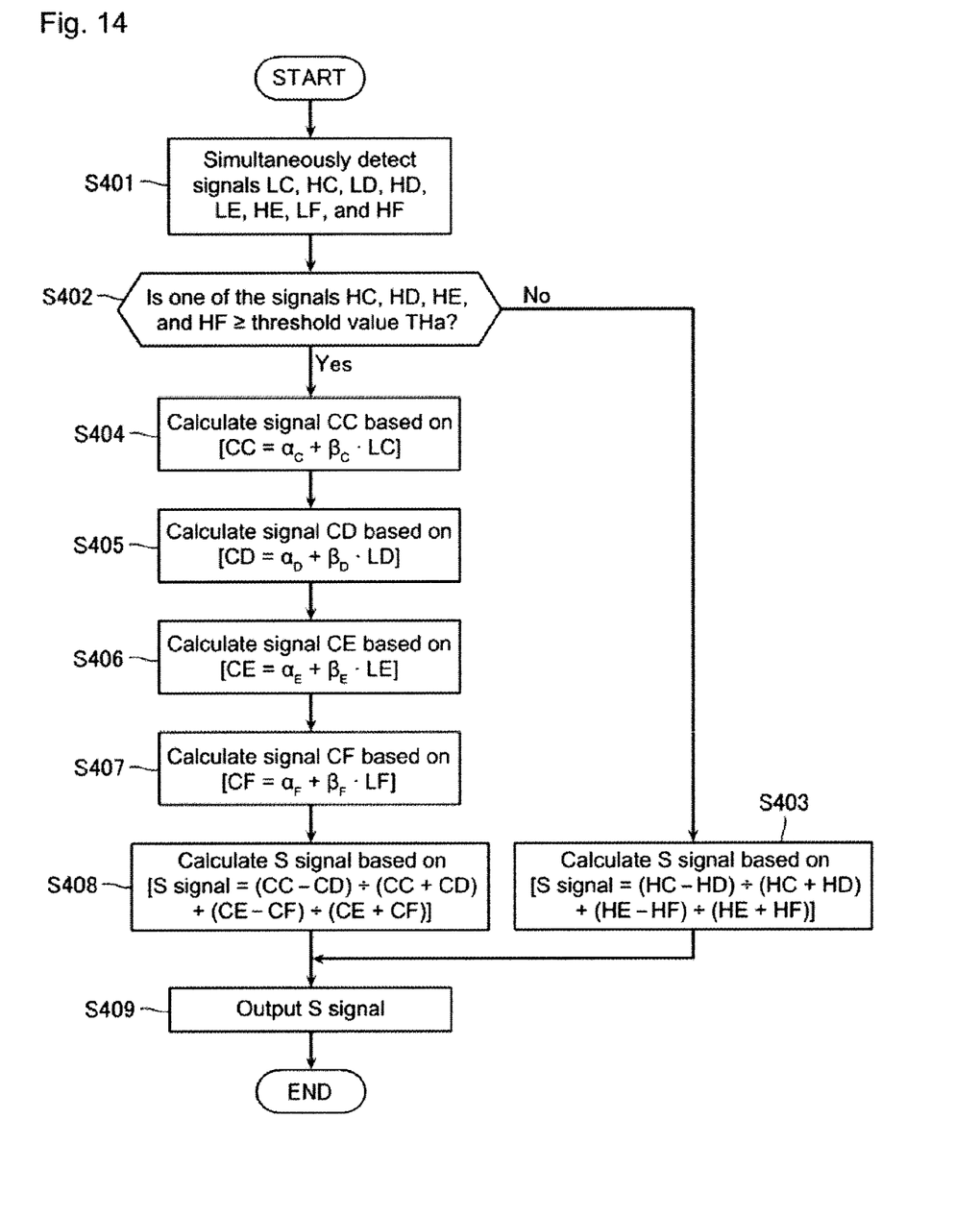
FIG. 14 is a flowchart illustrating a correction process according to the fifth embodiment.

Next, the correction process is described with reference to FIG. 14. In the fifth embodiment, the corrector 41b simultaneously detects the signals LC, HC, LD, HD, LE, HE, LF, and HF (S401). Next, the corrector 41b determines whether one of the signals HC, HD, HE, and HF is equal to or greater than the threshold value THa (S402).

When one of the signals HC, HD, HE, and HF is not equal to or greater than the threshold value THa (S402: No), the S signal calculator 41c calculates the S signal based on [S signal=(HC−HD)÷(HC+HD)+(HE−HF)÷(HE+HF)] (S403).

Meanwhile, when one of the signals HC, HD, HE, and HF is equal to or greater than the threshold value THa (S402: Yes), the corrector 41b corrects the signal LC based on [$CC=\alpha_C+\beta_C \cdot LC$] and calculates a signal CC (S404). Next, the corrector 41b corrects the signal LD based on [$CD=\alpha_D+\beta_D \cdot LD$] and calculates a signal CD (S405).

Then, the corrector 41b corrects the signal LE based on [$CE=\alpha_E+\beta_E \cdot LE$] and calculates a signal CE (S406). Next, the corrector 41b corrects the signal LF based on [$CF=\alpha_F+\beta_F \cdot LF$] and calculates a signal CF (S407). Then, the S signal calculator 41c calculates the S signal based on [S signal=(CC−CD)÷(CC+CD)+(CE−CF)÷(CE+CF)] (S408).

Then, after step S403 or S408, the S signal outputter 43 outputs the S signal (S409). This ends the correction process. The fifth embodiment, with the configuration described above, achieves a similar effect to that of the first embodiment.

Embodiments of the present invention were described above, but the present invention is not limited to these and can include various modifications, additions, and the like not deviating from the scope of the present invention. For example, in the fifth embodiment, the double knife-edge method was applied to the first embodiment. However, the double knife-edge method according to the fifth embodiment can also be applied to the second through fourth embodiments, as well.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. An autofocus mechanism comprising:
   a light source configured to emit light through an objective lens at a work piece;
   a first detector configured to detect a first portion of light reflected by the work piece and generate a first signal;
   a second detector configured to detect a second portion of the reflected light and generate a second signal;
   a first amplifier configured to amplify a voltage value of the first signal by a first amplification rate and generate a first amplified signal;
   a second amplifier configured to amplify the voltage value of the first signal by a second amplification rate greater than the first amplification rate, and to generate a second amplified signal;
   a third amplifier configured to amplify the voltage value of the second signal by a third amplification rate, and to generate a third amplified signal;
   a fourth amplifier configured to amplify the voltage value of the second signal by a fourth amplification rate greater than the third amplification rate, and to generate a fourth amplified signal;
   a corrector configured to correct one of the first amplified signal and the second amplified signal based on a first correction function expressing a relationship between the voltage value of the first amplified signal and the voltage value of the second amplified signal to generate one of a first corrected signal and a second corrected signal, the corrector further configured to correct one of the third amplified signal and the fourth amplified signal based on a second correction function expressing a relationship between the voltage value of the third amplified signal and the voltage value of the fourth amplified signal to generate one of a third corrected signal and a fourth corrected signal; and
   a focal position identifier configured to identify a focal position of the objective lens with respect to the work piece based on the first amplified signal and the third amplified signal or the first corrected signal and the third corrected signal in a case where one of the first signal and the second signal is equal to or greater than a first threshold value, wherein the focal position identifier identifies the focal position based on the second amplified signal and the fourth amplified signal or the second corrected signal and the fourth corrected signal in a case where one of the first signal and the second signal is not equal to or greater than the first threshold value.

2. The autofocus mechanism according to claim 1, wherein the focal position identifier identifies the focal position based on the first corrected signal and the third corrected signal in a case where one of the first signal and the second signal is equal to or greater than the first threshold value, and the focal position identifier further identifies the focal position based on the second amplified signal and the fourth amplified signal in a case where one of the first signal and the second signal is not equal to or greater than the first threshold value.

3. The autofocus mechanism according to claim 1, wherein the focal position identifier identifies the focal position based on the first amplified signal and the third amplified signal in a case where one of the first signal and the second signal is equal to or greater than the first threshold value, and the focal position identifier identifies the focal position based on the second corrected signal and the fourth corrected signal in a case where one of the first signal and the second signal is not equal to or greater than the first threshold value.

* * * * *